United States Patent [19]

Minamitani et al.

[11] Patent Number: 4,959,166

[45] Date of Patent: Sep. 25, 1990

[54] FLUID COMPOSITION FOR USE IN VISCOUS COUPLING

[75] Inventors: Hiromu Minamitani, Saitama; Norio Yano, Chiba; Atsushi Ikezawa, Kanagawa; Toshio Kanayama, Kanagawa; Takashi Ushijima, Kanagawa; Masao Teraoka, Tochigi; Osamu Ishikawa, Tochigi, all of Japan

[73] Assignees: Cosmo Oil Co., Ltd., Tokyo; Dow Corning Kabushiki Kaisha, Kanagawa; Tochigifujisangyo Kabushiki Kaisha, Tochigi, all of Japan

[21] Appl. No.: 199,827

[22] Filed: May 27, 1988

[30] Foreign Application Priority Data

May 30, 1987 [JP] Japan .................. 62-136610
Feb. 26, 1988 [JP] Japan .................. 63-41913

[51] Int. Cl.$^5$ .................................. C10M 109/50
[52] U.S. Cl. ........................... 252/327 E; 252/45; 252/47
[58] Field of Search ............ 252/32.7 E, 58, 45, 252/46.4, 48.8, 47, 48.8

[56] References Cited

U.S. PATENT DOCUMENTS

| 3,884,950 | 5/1975 | Koda et al. ............... 252/49.7 X |
| 4,059,534 | 11/1977 | Morro ....................... 252/32.7 E |
| 4,070,343 | 1/1978 | Kishimoto et al. ........ 252/49.7 X |
| 4,443,351 | 4/1984 | Keil ........................... 252/32.7 E |
| 4,501,678 | 2/1985 | Katayama ................. 252/32.7 E |

FOREIGN PATENT DOCUMENTS

| 51-24377 | 7/1976 | Japan . |
| 53-980 | 1/1978 | Japan . |
| 55-18457 | 5/1980 | Japan . |
| 56-14700 | 4/1981 | Japan . |
| 60-10535 | 3/1985 | Japan . |
| 0266986 | 2/1968 | U.S.S.R. .................. 252/32.7 E |
| 695308 | 8/1953 | United Kingdom . |
| 916678 | 1/1963 | United Kingdom . |
| 1296163 | 11/1972 | United Kingdom . |

OTHER PUBLICATIONS

Ikemoto, Y., Synthetic Lubricants in "Oil Chemistry (Abura Kagaki)", vol. 22, No. 11 (1973), pp. 707-713.
Synthetic Oils and Lubricant Additives, Noyes Data Corporation (1982), pp. 73-75, 91.

Primary Examiner—Olik Chaudhuri
Assistant Examiner—James M. Hunter, Jr.
Attorney, Agent, or Firm—Sughrue, Mion, Zinn, Macpeak & Seas

[57] ABSTRACT

A fluid composition for use in a viscous coupling is provided, which comprises (A) a base oil made of a polyorganosiloxane fluid having a viscosity of from about 500 to about 500,000 centistokes at 25° C., and (B) at least one component selected from the group consisting of sulfur and sulfur compounds (b) to (g) listed below being added in a minor amount to said base oil;
(b) a hydrocarbon sulfide;
(c) a sulfurized oil or fat which is the reaction product of an oil or fat and sulfur;
(d) a zinc dithiophosphate;
(e) a dialkyldithiocarbamic acid metal salt;
(f) elemental sulfur; and
(g) a cyclic hydrocarbon sulfide.

This fluid composition can be stably used in a viscous coupling for an extended period.

9 Claims, No Drawings

FLUID COMPOSITION FOR USE IN VISCOUS COUPLING

FIELD OF THE INVENTION

A viscous coupling is a shaft coupling and depends on the viscosity of a working fluid for its action and which is mounted in a differential mechanism or on a propeller shaft as an aid to achieving cruising stability of automobiles or extricating the automobile from off-road conditions. The durability of a viscous coupling largely depends on the performance of the working fluid with which it is filled.

The present invention relates to a fluid composition for use in a viscous coupling that remains stable during prolonged use.

BACKGROUND OF THE INVENTION

A viscous coupling is composed of a housing, a hub and several tens of thin annular iron plates attached to each of the housing and the hub, with a highly viscous working fluid being confined in the coupling. When a difference in rotational speed is created between the plate assemblies on the hub and housing sides, a shear force is exerted on the two plate assemblies and the torque generated on account of the viscosity of the working fluid is either transmitted or used to control the difference in rotational speed. The construction of a typical viscous coupling is described in Japanese Patent Publication No. 48779/83.

As described above, a viscous coupling depends on the viscous drag of the working fluid for its action and if it is to be installed in an automobile, it is required that the coupling be of the smallest possible size and yet be capable of generating the necessary torque. Therefore, working fluids of comparatively high viscosity have been employed with viscous couplings. Other requirements for working fluids used in viscous couplings are a small temperature dependency of the viscosity and a high stability at elevated temperatures. While silicone fluids have been conventionally used as working fluids, the most common is a dimethylpolysiloxane fluid having a viscosity of 5,000 to 500,000 centistokes at 25° C. However, this fluid has a potential to become very hot due to heat generation from shearing action on the fluid or the friction between plate assemblies and it often happens that during prolonged use, the fluid's viscosity increases until it eventually gels. If the working fluid in a viscous coupling undergoes a significant change in its viscosity or if it gels, the initial setting for the performance of the viscous coupling is no longer applicable. This has been the problem with conventional working fluids for viscous couplings that requires immediate solution.

In any attempt to improve the heat resistance of polyorganosiloxane, the addition of various compounds has been examined. Heat resistance improving agents so far proposed include: amines such as phenothiazine, diphenylamine, phenyl-α-naphthylamine, N-phenyl-N'-isopropyl-p-phenylenediamine, and N,N'-di-β-naphthyl-p-phenylenediamine; phenols such as 2,6-di-t-butylphenol, styrenated phenol, 4,4'-thiobis(6-t-butyl-m-cresol), and 4,4'-methylenebis(2,6-di-t-butylphenol); salts of octylic acid with metals such as iron, cerium and zirconium, organoselenium compounds, ferrocene, and siloxane compounds having improved miscibility with polyorganosiloxane such as ferro-siloxane, zirconium-siloxane (Japanese Patent Publication No. 14700/81), cerium-siloxane (Japanese Patent Publication Nos. 24377/76 and 980/78), siloxane having an aromatic amino group (Japanese Patent Publication Nos. 18457/80 and 10535/85), and zirconium-cerium-siloxane (Japanese Patent Application (OPI) No. 185597/86 (the term "OPI" as used herein means a "published unexamined Japanese patent application')).

The conventional method of improving the heat resistance of polyorganosiloxane through addition of heat-resistance improving agents proved to be effective in static laboratory-scale heat stability tests, in which a sample in a beaker was left to stand in a thermostatic chamber at 200 to 250° C. and its heat resistance was evaluated in terms of its tendency to increase in viscosity or the time required for it to gel. However, when tested or actual viscous couplings, the modifiers were incapable of preventing the increase in viscosity or gelation of the working fluid in which the modifiers were incorporated.

SUMMARY OF THE INVENTION

The present inventors conducted various studies in order to develop a working fluid that would perform stably for a prolonged period when used in viscous coupling. As a result, the present inventors found that a stable working fluid for viscous couplings can be produced by incorporating a specified sulfur-based additive in a polyorganosiloxane fluid used as a base oil. The present invention has been accomplished on the basis of this finding.

An object, therefore, of the present invention is to provide a stable working fluid for use in a viscous coupling.

Another object of the present invention is to provide a working fluid that can be used in a viscous coupling for a prolonged time with minimum variation in viscosity and without forming a gel.

These objects of the present invention can be attained by a fluid composition for use in a viscous coupling that comprises: (A) a base oil made of a polyorganosiloxane fluid that is represented by an average unit formula (a):

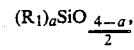

where $R_1$ is a monovalent hydrocarbon group or a monovalent halogenated hydrocarbon group, and a is a number of 1.9 to 2.1, and which has a viscosity of from about 500 to about 500,000 centistokes at 25° C., and (B) at least one component selected from the group consisting of sulfur and sulfur compounds (b) to (g) listed below being added in a minor amount to said base oil:

(b) a hydrocarbon sulfide represented by the formula:

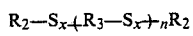

where $R_2$ is a monovalent hydrocarbon group; $R_3$ is a divalent hydrocarbon group; x is an integer of 1 or more and may be the same or different in the recurring units, and n is 0 or an integer of 1 or more;

(c) a sulfurized oil or fat which is the reaction product of an oil or fat and sulfur;

(d) a zinc dithiophosphate represented by the formula:

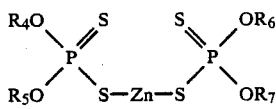

where $R_4$, $R_5$, $R_6$ and $R_7$ which may be the same or different are each a monovalent hydrocarbon group;

(e) a dialkyldithiocarbamic acid metal salt represented by the formula:

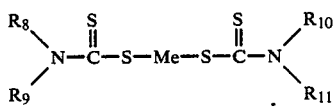

where $R_8$, $R_9$, $R_{10}$ and $R_{11}$ which may be the same or different are each an alkyl group, and Me is a metal selected from the group consisting of Zn, Pb, Mo and Sb;

(f) elemental sulfur; and (g) a sulfurized hydrocarbon compound represented by the formula:

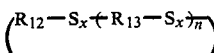

where $R_{12}$ and $R_{13}$ are each a divalent hydrocarbon group, x is an integer of 1 or more and may be the same or different in the recurring unit, and n is 0 or an integer of 1 or more.

DETAILED DESCRIPTION OF THE INVENTION

The principal component of the fluid composition of the present invention is a polyorganosiloxane fluid represented by the average unit formula (a), in which $R_1$ is a monovalent hydrocarbon group or a monovalent halogenated hydrocarbon group. Illustrative hydrocarbon groups are straight-chained or branched, saturated or unsaturated aliphatic hydrocarbon groups having 1 to 12 carbon atoms (e.g., alkyl and alkenyl groups) and aromatic hydrocarbon groups having 6 to 18 carbon atoms. Illustrative monovalent halogenated hydrocarbon groups are the hydrocarbon groups listed above in which at least one hydrogen atom is replaced by a halogen atom (e.g. fluorine, chlorine or bromine). Desirable aliphatic hydrocarbon groups and halogenated aliphatic hydrocarbon groups are those which have 1 to 8 carbon atoms, such as methyl, ethyl, butyl, hexyl, octyl, trifluoropropyl and octenyl groups. Exemplary aromatic hydrocarbon groups include phenyl, tolyl and xylyl groups. These groups which are bound to silicon atoms may be the same or different. Polyorganosiloxane has a straight-chained skeleton with minor amounts of branched portions being optionally present. With polyorganosiloxane compounds of the formula (a), a is close to 2.0 to 2.1 and close to 2.0 if they are straight-chained and have high molecular weights, is 2.0 to 2.1 and close to 2.1 if they have low molecular weights, and a is 1.9 to 2.0 if they contain branched portions. Examples of the polyorganosiloxane fluid suitable for use in the present invention include: a polydimethylsiloxane fluid; a polydimethyl-methylphenylsiloxane fluid, a polymethylphenylsiloxane fluid, a polydimethyldiphenylsiloxane fluid, a polymethylhexylsiloxane fluid, a polymethyloctylsiloxane fluid, a polymethyltrifluoropropylsiloxane fluid, and a polydimethyl-methyltrifluoropropylsiloxane fluid. Besides these homopolymers and copolymers, mixtures thereof may be employed.

The terminal ends of the molecular chain of the polyorganosiloxane fluid is desirably terminated with a triorganosilyl group, such as trimethylsilyl or triethylsilyl group.

The polyorganosiloxane fluids listed above have viscosities at 25° C. in the range of from about 500 to about 500,000 centistokes, preferably from about 5,000 to about 400,000 centistokes. If their viscosity is too low, they produce such a small viscous drag that the capacity of the viscous coupling must be greatly increased. If their viscosity is too high, they produce such a high viscous drag that excessive heat generation may impair the durability of the viscous coupling. In the composition of the present invention, the polyorganosiloxane fluid is incorporated as a base oil. The base oil content assumes the major proportion of the composition, usually in the range of from about 90 to 99.99 wt%, preferably from about 95 to 99.95 wt%, of the composition.

These polyorganosiloxane fluids (a) have been described in detail in Japanese Patent Application (OPI) No. 18597/86.

In accordance with the present invention, a minor amount of elemental sulfur or the specified sulfur-based additive (B) is incorporated into the base oil (A) made of the above-specified polyorganosiloxane fluid. The components to be added to the base oil (A) is described hereinafter.

One component that can be added to the base oil (A) is a sulfur compound represented by the formula set forth in the description of component (b) above, wherein $R_2$ is a monovalent hydrocarbon group, x is preferably an integer of 1 to 10 and n is preferably an integer of 0 to about 50. Illustrative hydrocarbon groups $R_2$ are straight-chained or branched, saturated or unsaturated aliphatic hydrocarbon groups having 2 to 20 carbon atoms (e.g. alkyl and alkenyl groups) and aromatic hydrocarbon groups having 6 to 26 carbon atoms. More specific examples of such hydrocarbon groups include: ethyl, propyl, butyl, nonyl, dodecyl, propenyl, butenyl, benzyl, phenyl, tolyl and hexylphenyl groups. In the formula described with respect to component (b) above, $R_3$ is a divalent hydrocarbon group illustrated by a straight-chained or branched aliphatic hydrocarbon group having 2 to 20 carbon groups, or an aromatic hydrocarbon group having 6 to 26 carbon atoms. Specific examples of such divalent hydrocarbon groups include: ethylene, propylene, butylene and phenylene groups. Typical examples of the sulfur compound represented by the formula described with respect to component (b) above are sulfurized olefins and polysulfide compounds represented by the formula: $R_2-S_y-R_2$ (where y is an integer of 2 or more). More specific examples of the sulfur compounds represented by component (b) include the following: diisobutyl disulfide; dioctyl polysulfide; ditertiary nonyl polysulfide; ditertiary butyl polysulfide; dibenzyl polysulfide; sulfurized olefins prepared by sulfurizing olefins such as polyisobutylene and terpenes with a sulfurizing agent such as sulfur; and the reaction product of isobutylene and sulfur, which is believed, but not proven to have the formula:

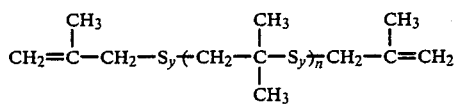

and/or the formula:

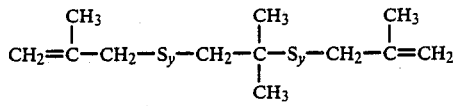

Another component that can be added to the base oil (A) is a sulfurized oil or fat that is the reaction product of an oil or fat with sulfur and which is described as component (c) above. Illustrative fats and oils include lard, tallow, whale oil, palm oil, coconut oil, rapeseed oil and many other animal and vegetable oils and fats. The reaction products of these fats and oils and sulfur are not simple in their chemical structure and instead are mixtures of various chemical structures which themselves are not clearly identified.

Still another component that can be added to the base oil (A) is the zinc dithiophosphate represented by the formula set forth with respect to component (d) above, wherein $R_4$, $R_5$, $R_6$ and $R_7$ which may be the same or different are each a monovalent hydrocarbon group. Illustrative hydrocarbon groups include straight-chained or branched, saturated or unsaturated aliphatic hydrocarbon groups having 3 to 20, notably 3 to 12, carbon atoms (e.g., alkyl and alkenyl groups), and aromatic hydrocarbon groups having 6 to 20 carbon atoms. Specific examples of such hydrocarbon groups include: propyl, butyl, nonyl, dodecyl, octenyl, phenyl and tolyl groups. Specific examples of the compound represented by component (d) include: zinc diisobutyl dithiophosphate, zinc dipentyl dithiophosphate, zinc di-1-methylheptyl dithiophosphate, zinc di-2-ethylhexyl dithiophosphate, and zinc diphenyl dithiophosphate.

Another component that can be added to the base oil (A) is a dialkyl dithiocarbamate metal salt represented by the formula set forth in the description of component (e) above, wherein $R_8$, $R_9$, $R_{10}$ and $R_{11}$ which may be the same or different are each an alkyl group having 3 to 20 carbon atoms, preferably 3 to 12 carbon atoms, as illustrated by a propyl, butyl, nonyl or dodecyl group. Me in the formula is a metal selected from among Zn, Pb, Mo and Sb. Specific examples of the compound represented by the component (e) include zinc diisobutyl dithiocarbamate, zinc diamyldithiocarbamate and lead didodecyldithio carbamate.

Sulfur as component (f) can also be added to the base oil (A). Sulfur is in powder form and does not dissolve by itself. If it is put into the polyorganosiloxane fluid and heated at about 150 to 250° C. with stirring, it will dissolve or react with the polyorganosiloxane and the sulfur in solid form will disappear.

Another component that can be added to the base oil (A) is a cyclic sulfur compound represented by the formula set forth in the description of component (g) above, where $R_{12}$ and $R_{13}$ are each a divalent hydrocarbon group, x is preferably an integer of 1 to 10 and n is preferably an integer of 0 to about 50. Illustrative hydrocarbon groups $R_{12}$ and $R_{13}$ are straight-chained or branched aliphatic hydrocarbon groups having 2 to 20 carbon atoms, and aromatic hydrocarbon groups having 6 to 26 carbon atoms. Specific examples of such divalent hydrocarbon groups are ethylene, propylene, butylene and phenylene groups. An example of the sulfur compound of the formula set forth in the description of component (g) above is a compound represented by the following formula:

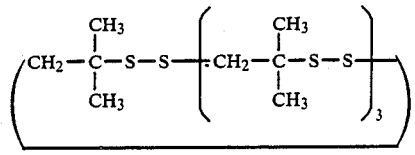

The cyclic sulfur compound described above may be prepared by the method of synthesis described in U.S. Pat. No. 3,925,414; for instance, an olefin such as isobutylene is reacted with sulfur monohalide and the resulting product is further reacted with an alkali mercaptide.

In accordance with the present invention, the polyorganosiloxane represented by the formula (a) is mixed with the component (b) in an amount ranging from about 0.01 to 10 wt%, preferably from about 0.1 to 5 wt%, so as to produce a desired fluid composition for use in a viscous coupling. If the content of component (b) is too low, the intended effect is not attained. If the content of component (b) is too high, the polyorganosiloxane (a) or component (b) will undergo thermal deterioration to an undesirably large extent. The same remarks apply to the other components (c), (d), (e), (f) and (g). A particularly preferred content of elemental sulfur as component (f) ranges from about 0.01 to 5.0 wt%, more preferably from about 0.05 to 2.0 wt%, with the sulfur being incorporated in the polyorganosiloxane represented by (a). With the composition of the present invention, the component that is to be mixed with the component (a) preferably dissolves in the polyorganosiloxane fluid serving as the base oil. But this is not necessarily the essential requirement and the component to be added may be merely dispersed in the highly viscous base oil. If desired, the component to be added may react with the base oil. Unless otherwise noted, the contents of the components to be incorporated in the composition of the present invention are expressed on the basis of the total amount of the composition.

The components (b), (c), (d), (e), (f) and (g) exhibit their intended effects even if they are added individually to the polyorganosiloxane represented by (a). Needless to say, two or more of these components may be added as admixtures to the polyorganosiloxane. In this latter case, the total content of the additional components (b) to (g) is preferably within the range of from about 0.01 to 10 wt%.

The sulfurized olefines (b) and the sulfurized oils or fats (c) listed above has been described in detail in *Synthetic Oils and Lubricant Additives*, pp. 73–75, p. 91, published by Noyes Data Corporation, 1982, and *Lubricant Oils and Greases*, p. 390, published by Sankyo Shuppan Company, 1968.

The zinc dithiophosphates (d) and the dialkyldithio carbamic acid metal salts (e) listed above have been described in detail in *Additives for Petroleum Products*, pp. 218–237, published by Saiwai Shobo Company, 1986, and *Metal-Based Lubricant Compositions*, pp. 171–181, pp. 184–185, published by Noyes Data Corporation, 1975.

It should be mentioned that the conventional heat-resistance improving agents mentioned in the introductory part of this specification, as well as other common additives may also be added to the composition of the present invention. Since the composition of the present invention is to be exposed to various hostile conditions of its service as a working fluid in viscous couplings, it will be desirable in certain instances to additionally incorporate conventional heat-resistance improving agents to said composition.

The working fluid of the present invention for use in a viscous coupling can be used for a prolonged period with minimum change in its viscosity and without forming a gel. Besides being stable, the working fluid of the present invention offers the additional advantage of improving the wear resistance of the plate assemblies in the viscous coupling, thereby enhancing its durability as well as the reliability of an automobile using that viscous coupling.

The following examples are provided for the purpose of further illustrating the present invention but are in no way to be taken as limiting. All the values of viscosity set forth hereinafter were measured at 25° C., unless otherwise indicated. Further, unless otherwise indicated, all percents, ratios, etc. are by weight.

EXAMPLES 1 TO 13 AND COMPARATIVE EXAMPLES 1 TO 3

Fluid compositions were prepared in Examples 1 to 13 and Comparative Examples 1 to 3 according to the formulations shown in Tables 1 and 2. The general properties of the compositions prepared are shown in Table 3. All the compositions excepting those prepared in Examples 6, 8, 10 and 13 were prepared by mixing at 60° C. for 1 hour with stirring the necessary components in the proportions indicated in Tables 1 and 2. In Examples 6, 8, 10 and 13, the compositions were prepared by mixing the necessary components in the proportions indicated in Table 1 and stirring them at 200° C. for 1 hour. All of the polyorganosiloxane reagents used in Examples 1 to 13 and Comparative Examples 1 to 3 had the terminal ends of their molecular chain terminated with a trimethylsilyl group. The ditertiary nonyl polysulfide used in Example 1 was "TNPS" (trade name of Nippon Thiochemical Co., Ltd.) having a specific gravity of 1.045 (15° C./4° C.) and a sulfur content of 37.5 wt%. Sulfurized olefin (1) used in Examples 2 and 9 was "HITEC 053" (trade name of Nippon Cooper Co., Ltd.) having a specific gravity of 1.14 (15° C./4° C.), a sulfur content of 46.5 wt%, and a viscosity of 9.0 centistokes at 100° C. The sulfurized fat or oil used in Example 3 was "S-285" (trade name of Dainippon Ink & Chemicals, Inc.) having a specific gravity of 1.004 (15° C./4° C.) and a sulfur content of 14.5 wt%. The zinc used in Example 4 was "HITEC 653" (trade name of Nippon Cooper Co., Ltd.) having a specific gravity of 1.10 (15° C./4° C.), a zinc content of 8.5 wt%, and a sulfur content of 17.0 wt%. The lead diamyldithiocarbamate used in Example 5 was "VANLUBE 71" (trade name of R.T. Vanderbilt Company, Inc.) having a viscosity of 5.73 centistokes at 100° C. and a density of 1.10 g/cm³ at 25° C. The elemental sulfur powder used in Examples 6, 8 and 10 was a reagent (purity≦98.0 wt%) available from Wako Pure Chemical Industries, Ltd. The zirconium siloxane used in Example 7 and Comparative Example 2 had a specific gravity of 0.993 at 25° C., a viscosity of 25 centistokes and a zirconium content of 3.0 wt%. The dibutyl disulfide used in Example 7 was a reagent available from Kanto Kagaku K.K. that had a specific gravity of 0.938 at 20° C. and a sulfur content of 36.0 wt%. The zinc dialkyldithiophosphate (2) used in Example 8 was "TLA 643" (trade name of Texaco Chemical Company, Ltd.) containing two alkyl groups of 3 and 6 carbon atoms and having a specific gravity of 1.11 (15° C./4° C.), a zinc content of 8.7 wt% and a sulfur content of 16.2 wt%. The dibenzyl disulfide used in Example 11 was "S-700" (trade name of Dainippon Ink & Chemicals, Inc.) having a sulfur content of 25.5 wt%. The sulfurized olefin (2) used in Example 12 was "Anglamol 33" (trade name of the The Lubrizol Corporation) having a specific gravity of 1.11 at 60° F. and a sulfur content of 42.5 wt%. The sulfurized olefin (3) used in Example 13 was synthesized by the process described in U.S. Pat. 3,925,414: reacting isobutylene with sulfur monochloride, then reacting the resulting product with sodium mercaptide. The so synthesized product was a cyclic sulfur compound having the following structural formula:

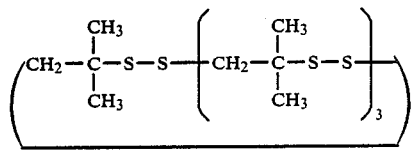

The iron octylate used in Comparative Example 1 had a specific gravity of 0.935 at 25° C. and an iron content of 6.0 wt%. The siloxane having an aromatic amino group which was used in Comparative Example 3 had a specific gravity of 1.080 at 25° C. and a viscosity of 115 centistokes.

The compositions prepared in Examples 1 to 13 and Comparative Examples 1 to 3 were evaluated for their performance as working fluids for use in a viscous coupling. The evaluation procedure was as follows: a viscous coupling having a set of 59 plates and which had an internal capacity of about 105 ml was charged with the compositions to a fill ratio of 90 vol%; the coupling was continuously rotated at a differential velocity of 100 rpm for 200 hours with the fluid temperature held at 130° C.; and the resulting changes in torque and viscosity were determined. As for the samples prepared in Example 11 and Comparative Example 3, the viscous couplings were rotated continuously for 200 hours at a differential velocity of 50 rpm. The increase in the iron content of each fluid was also measured. The changes of torque were determined by measuring the torque generated at a differential velocity of 30 rpm both before and after the continuous rotation of the viscous coupling. The results are shown in Table 4, from which one can see that the compositions prepared in Examples 1 to 13 according to the present invention experienced smaller degrees of change in viscosity, and hence in torque, than the comparative samples prepared according to the prior art technique, indicating the superiority of the samples of the present invention as working fluids for use in viscous couplings. The iron content in the fluids after testing was due to the iron that dissolved into the fluids from the worn plates. Since the samples prepared in accordance with the present invention had smaller iron contents, it is clear that they have some ability to prevent the wear of the plates in viscous couplings. To summarize the advantages of the working fluid of the present invention, it is capable of increasing the durability and reliability of viscous couplings in which it is used.

TABLE 1

| Example No. | Composition | wt % |
|---|---|---|
| 1 | Polydimethylsiloxane (12,500 cSt) | 99.0 |
|  | Ditertiary nonyl polysulfide | 1.0 |
| 2 | Polydimethylsiloxane (12,500 cSt) | 99.5 |
|  | Sulfurized olefin (1) | 0.5 |
| 3 | Polydimethylsiloxane (12,500 cSt) | 98.0 |
|  | Sulfurized fat or oil | 2.0 |
| 4 | Polydimethylsiloxane (12,500 cSt) | 97.0 |
|  | Zinc dialkyl (having carbon number of 6) dithiophosphate (1) | 3.0 |
| 5 | Polydimethylsiloxane (12,500 cSt) | 99.0 |
|  | Lead diamyldithiocarbamate | 1.0 |
| 6 | Polydimethylsiloxane (12,500 cSt) | 99.9 |
|  | Elemental sulfur powder | 0.1 |
| 7 | Polydimethylsiloxane (12,500 cSt) | 99.0 |
|  | Dibutyl disulfide | 0.5 |
|  | Zirconium siloxane | 0.5 |
| 8 | Polydimethylsiloxane (12,500 cSt) | 99.4 |
|  | Zinc dialkyldithiophosphate (2) | 0.5 |
|  | Elemental sulfur powder | 0.1 |
| 9 | Polymethylphenylsiloxane (30,000 cSt) | 99.8 |
|  | Sulfurized olefin (1) | 0.2 |
| 10 | Polymethyltrifluoropropylsiloxane (10,000 cSt) | 99.98 |
|  | Elemental sulfur powder | 0.02 |
| 11 | Polydimethylsiloxane (100,000 cSt) | 98.5 |
|  | Dibenzyl disulfide | 1.5 |
| 12 | Polydimethylsiloxane (300,000 cSt) | 99.5 |
|  | Sulfurized olefin (2) | 0.5 |
| 13 | Polydimethylsiloxane (12,500 cSt) | 99.0 |
|  | Sulfurized olefin (3) | 1.0 |

TABLE 2

| Comparative Example No. | Composition | wt % |
|---|---|---|
| 1 | Polydimethylsiloxane (12,500 cSt) | 99.0 |
|  | Iron octylate | 1.0 |
| 2 | Polydimethylsiloxane (12,500 cSt) | 99.5 |
|  | Zirconium siloxane | 0.5 |
| 3 | Polydimethylsiloxane (100,000 cSt) | 99.0 |
|  | Siloxane having an aromatic amino group | 1.0 |

TABLE 3

| Run No. | Viscosity (cSt/25° C.) | Temperature coefficient of viscosity (VTC*) | Specific gravity (25° C.) | Pour point (°C.) |
|---|---|---|---|---|
| Example 1 | 11,700 | 0.59 | 0.973 | −60.0 |
| 2 | 12,100 | 0.59 | 0.973 | −60.0 |
| 3 | 12,400 | 0.60 | 0.973 | −60.0 |
| 4 | 11,100 | 0.60 | 0.976 | −60.0 |
| 5 | 12,000 | 0.60 | 0.973 | −60.0 |
| 6 | 12,400 | 0.59 | 0.972 | −60.0 |
| 7 | 11,300 | 0.59 | 0.972 | −60.0 |
| 8 | 12,100 | 0.59 | 0.973 | −60.0 |
| 9 | 29,500 | 0.63 | 0.998 | −55.0 |
| 10 | 9,900 | 0.80 | 1.297 | −30.0 |
| 11 | 95,500 | 0.60 | 0.974 | −45.0 |
| 12 | 282,000 | 0.59 | 0.973 | −42.5 |
| 13 | 11,700 | 0.59 | 0.973 | −60.0 |
| Comparative Example 1 | 11,600 | 0.59 | 0.971 | −60.0 |
| 2 | 11,900 | 0.59 | 0.972 | −60.0 |
| 3 | 91,000 | 0.59 | 0.973 | −45.0 |

VTC* = 1 − (viscosity at 210° F./viscosity at 100° F.)

TABLE 4

| Run No. | Change in torque (%) | Change in viscosity (%) | Iron content after test (wt %) |
|---|---|---|---|
| Example 1 | −5 | −15 | 0.3 |
| 2 | −3 | −8 | 0.5 |
| 3 | +6 | +15 | 0.2 |
| 4 | +9 | +35 | 0.5 |
| 5 | +8 | +27 | 0.7 |
| 6 | −10 | −21 | 0.2 |
| 7 | +1 | +2 | 0.1 |
| 8 | −3 | −6 | 0.2 |
| 9 | ±0 | +1 | 0.7 |
| 10 | +3 | +3 | 0.1 |
| 11 | +11 | +32 | 0.8 |
| 12 | +15 | +36 | 0.7 |
| 13 | −5 | −10 | 0.5 |
| Comparative Example 1 | +221 | +5062 | 2.4 |
| 2 | +181 | +3135 | 3.1 |
| 3 | +54 | +672 | 1.7 |

While the invention has been described in detail and with reference to specific embodiments thereof, it will be apparent to one skilled in the art that various changes and modifications can be made therein without departing from the spirit and scope thereof.

What is claimed is:

1. A fluid composition for use in a viscous coupling that comprises: (A) from 90% to 99.99% by weight of a base oil consisting essentially of a polyorganosiloxane fluid that is represented by an average unit formula. (a):

$$(R_1)_a SiO_{\frac{4-a}{2}},$$

where $R_1$ is selected from the group consisting of a monovalent hydrocarbon group and a monovalent halogenated hydrocarbon group, and a is a number of 1.9 to 2.1, and which has a viscosity of from about 500 to about 500,000 centistokes at 25° C., and (B) at least one component selected from the group consisting of sulfur and sulfur compounds (b) to (g) listed below being added in a minor amount to said base oil:

(b) a hydrocarbon sulfide represented by the formula:

$$R_2-S_x-(R_3-S_x)_{\overline{n}}R_2$$

where $R_2$ is a monovalent hydrocarbon group, $R_3$ is a divalent hydrocarbon group, x is an integer of 1 or more and may be the same or different in the recurring units, and n is 0 or an integer of 1 or more;

(c) a sulfurized oil or fat which is the reaction product of an oil or fat and sulfur;

(d) a zinc dithiophosphate represented by the formula:

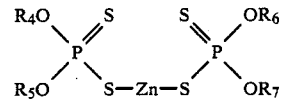

where $R_4$, $R_5$, $R_6$ and $R_7$ which may be the same or different are each a monovalent hydrocarbon group;

(e) a dialkyldithiocarbamic acid metal salt represented by the formula:

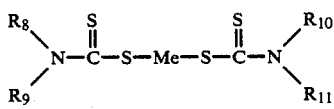

where $R_8$, $R_9$, $R_{10}$ and $R_{11}$ which may be the same or different are each an alkyl group, and Me is a metal selected from the group consisting of Zn, Pb, Mo and Sb;

(f) elemental sulfur; and (g) a sulfurized hydrocarbon compound represented by the general formula:

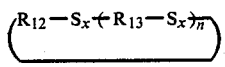

wherein $R_{12}$ and $R_{13}$ are each of divalent hydrocarbon group, x is an integer of 1 or more and may be the same or different in the recurring units, and n is 0 or an integer of 1 or more.

2. A fluid composition according to claim 1, wherein said polyorganosiloxane fluid is selected from the group consisting of a polydimethylsiloxane fluid, a polydimethyl-methylphenylsiloxane fluid, a polymethylphenylsiloxane fluid, a polydimethyl-diphenylsiloxane fluid, a polymethylhexylsiloxane fluid, and polymethyloctylsiloxane fluid, a polymethyltrifluoropropylsiloxane fluid and a polydimethyl-methyltrifluoropropylsiloxane fluid.

3. A fluid composition according to claim 1, wherein the hydrocarbon sulfide component (b) is selected from the group consisting of diisobutyl disulfide, dioctyl polysulfide, ditertiary nonyl polysulfide, ditertiary butyl polysulfide, dibenzyl polysulfide, a sulfurized olefin prepared by sulfurizing an olefin with sulfur, and the reaction product of isobutylene and sulfur.

4. A fluid composition according to claim 1, wherein the sulfurized fat or oil component (c) is the product of a reaction between sulfur and an animal or vegetable oil or fat selected from the group consisting of lard, tallow, whale oil, palm oil, coconut oil and rapeseed oil.

5. A fluid composition according to claim 1, wherein the zinc dithiophosphate component (d) is selected from the group consisting of zinc diisobutyl dithiophosphate, zinc dipentyl dithiophosphate, zinc di-2- methylheptyl dithiophosphate, zinc di-2-ethyl-hexyl dithiophosphate and zinc diphenyl dithiophosphate.

6. A fluid composition according to claim 1, wherein the dialkyldithiocarbamic acid metal salt component (e) is selected from the group consisting of zinc diisobutyl dithiocarbamate, zinc diamyldithiocarbamate and lead didodecyldithiocarbamate.

7. A fluid composition according to claim 1, wherein the cyclic sulfurized hydrocarbon component (g) is a sulfurized hydrocarbon represented by the following formula:

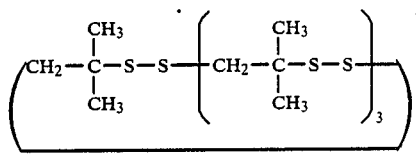

8. A fluid composition according to claim 1, wherein the polyorganosiloxane component (A) is present in an amount of 95 to 99.95 wt %.

9. A fluid composition according to claim 1, wherein sulfur or sulfur compound component (B) is present in an amount of 0.01 to 10 wt %.

* * * * *